United States Patent [19]

Lersch et al.

[11] Patent Number: 4,968,566

[45] Date of Patent: Nov. 6, 1990

[54] ARRANGEMENT FOR RECOVERING WATER FROM A FUEL CELL BATTERY

[75] Inventors: Josef Lersch; Burghard Grave, both of Erlangen, Fed. Rep. of Germany

[73] Assignee: Siemens Aktiengesellschaft, Berlin & Munich, Fed. Rep. of Germany

[21] Appl. No.: 390,190

[22] Filed: Aug. 3, 1989

[30] Foreign Application Priority Data

Aug. 4, 1988 [DE] Fed. Rep. of Germany ....... 3826590

[51] Int. Cl.$^5$ ............................................. H01M 8/04
[52] U.S. Cl. ........................................ 429/22; 429/34
[58] Field of Search ............................... 429/22, 32, 34

[56] References Cited

U.S. PATENT DOCUMENTS

| | | | |
|---|---|---|---|
| 3,823,038 | 7/1974 | Gidaspow et al. | 429/34 |
| 3,861,958 | 1/1975 | Cheron | 429/22 X |
| 4,769,247 | 9/1988 | Reiser et al. | 429/30 X |

Primary Examiner—Stephen J. Kalafut
Attorney, Agent, or Firm—Kenyon & Kenyon

[57] ABSTRACT

Fuel cell batteries are provided wherein water produced during operation is quickly and easily removed even when the battery is in an inclined position. Those chambers in the fuel cell battery from which water is to be removed are each interconnected two times. One discharge point is provided for each lower corner point of the battery, whereby two of the discharge points arranged at one battery extremity are connected respectively to one of the two terminal chambers. The discharge points are connected via media lines to at least one charging valve. One valve is arranged in each media line. An inclination sensor is arranged on the battery parallel to the longitudinal and transverse axis of the battery and is connected via a control line to a control unit which is connected to the valves.

15 Claims, 1 Drawing Sheet

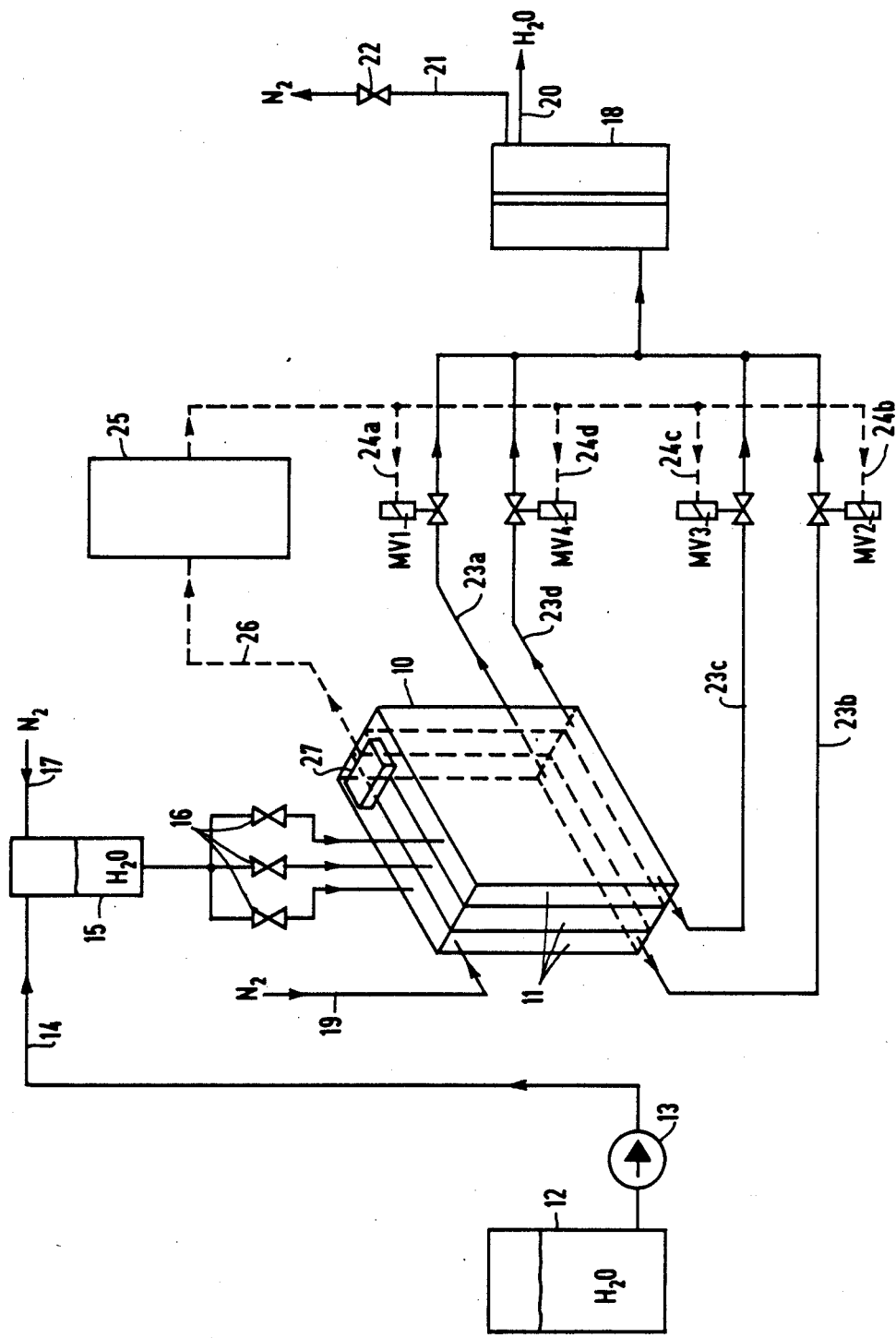

4,968,566

ARRANGEMENT FOR RECOVERING WATER FROM A FUEL CELL BATTERY

FIELD OF THE INVENTION

The invention relates to an arrangement for recovering water from a fuel cell battery with perpendicularly arranged fuel cells, in particular from the oxygen chambers of a solid polymer electrolyte fuel cell battery, as well as to a method for operating such an arrangement.

BACKGROUND OF THE INVENTION

In fuel cells or fuel cell batteries water is produced as a reaction product because of the reaction between the hydrogenous fuel and the oxidizing means, which is generally oxygen or air. The water must be removed. In so-called Solid Polymer Electrolyte fuel cells ("SPE"), that is fuel cells with a $H^+$-ion conductive, polymer solid electrolyte, the water collects practically exclusively on the cathode (i.e., on the oxygen side). The water must be removed from the oxygen chambers to assure a proper electrode functioning, and this must be done without a long delay.

The recovery of reaction water from the fuel cells or fuel cell batteries should be guaranteed under all permissible operating conditions, including operation at full load and especially when the battery is in an inclined position. However, until now, it has not been possible to operate batteries in a permanently inclined position.

An object of the present invention is to provide a fuel cell battery of the type previously mentioned which allows for the easy removal of the water produced during operation without a long delay, when the battery is in an inclined position.

It is a further object of the invention to provide a SPE fuel cell battery wherein the water produced during operation can be recovered irrespective of the position or inclination of the fuel cell battery.

SUMMARY OF THE INVENTION

The objects of the invention are achieved in accordance with the invention by providing a fuel cell battery wherein the chambers from which water is to be removed are each interconnected in the lower area two times. One discharge point is provided in the area of the four lower corner points of the fuel cell battery for each corner point, whereby two discharge points arranged on one battery extremity are each connected with one of the two terminal chambers, and the four discharge points are connected via media lines with at least one sluice. A valve is arranged in each media line, and an inclination sensor is arranged on the fuel cell battery, parallel to the longitudinal and transverse axis of the battery. The inclination sensor is connected via a control line to a control unit, and the control unit is connected via control lines to the valves.

DETAILED DESCRIPTION OF THE INVENTION

In the arrangement or fuel cell battery of the invention, in which the individual fuel cells are arranged perpendicularly, the reaction water collects - under the influence of gravity and/or the influence of a gas flow - in the lower section. In SPE fuel cells, this is the bottom section of the oxygen chambers. To recover water from the battery independent of the extent of inclination, one discharge point is provided at each of the four lower corners of the battery. These discharge points are connected via tubing with at least one sluice or charging valve, where the water is isolated. All of the lines are preferably connected to one central charging valve. Each of the four valves can be blocked or opened with the help of a valve, preferably a solenoid valve.

It is advantageous to transport the water out of the fuel cell battery into the charging valve(s) with the help of a gas flow. The gas flow can be adjusted, thereby enabling inert gas to be recovered at the same time.

A suitable control system ensures that only one of the four valves in the connecting lines between the discharge points and the charging valve(s) is open. If the battery happens to be in an inclined position (i.e., not positioned horizontally), this is the line which emanates from the deepest discharge point. The switching signals from an inclination sensor control the valves. If two or all of the four discharge points are situated at the same level, then a priority circuit ensures that only one valve is open at a time.

The above-described principle can also apply to recovering water from hydrogenous chambers in SPE fuel cells, that is, on the anode side as well. Moreover, this principle can also apply to an operation in an inclined position, when the condensation water is transported from the water depletion units in fuel cell batteries with liquid electrolytes into a charging valve.

The invention shall now be explained in greater detail with reference to the following Example and FIG. 1.

Example

FIG. 1 schematically depicts a test setup, which will make it possible to simulate the approximate operational conditions, under which the arrangement of the invention functions.

A defined volume of water from a storage tank 12 is supplied under pressure (approximately 1.1 bar) to a simulation cell 10, consisting of three chambers 11. This is achieved by means of a pump 13 arranged in a tubing 14, via a reservoir 15 and three adjustable drop counters 16, each one of which is assigned to one of the three chambers 11. By way of a line 17, the reservoir 15 is pressurized with a gas, preferably nitrogen.

The water is conducted under pressure (approximately 0.9 bar gauge pressure) from the simulation cell 10 by means of a gas, preferably nitrogen, into a sluice or charging valve 18 and disposed removed of by means of an adjustable rinsing rate of a scavenger system. The gas is thereby supplied to the simulation cell 10 in the upper area by means of a line 19 and guided in a suitable way to the individual chambers 11. The water leaves the charging valve 18 via a line 20, the gas via a line 21, in which a valve 22 is arranged.

The lines 23a, 23b, 23c and 23d serve to supply the water to the charging valve 18. These lines are connected to the simulation cell 10 in the area of the lower four corner points, such that one line is at every corner point. Thereby, two lines 23a and 23b or 23c and 23d are connected respectively to one of the two terminal chambers 11. In their lower area, these chambers are interconnected in a suitable way (not shown in the Figure). In practice, these interconnections can be made, for example, by cross-intersecting canals. They connect the mentioned chambers with a canal, which is arranged in the cell frame below these chambers and penetrates the entire battery. Also, one of the mentioned lines is thereby connected respectively to the two canal ends.

In a corresponding way, the gas can be supplied to the chambers 11, whereby the line 19 is connected to the one end of a canal, which runs in the cell frame above these chambers, and whereby the cross-intersecting canals discharge into this canal.

One solenoid valve (MV1...MV4) is arranged in each of the lines 23a to 23d. The solenoid valves are connected via control lines 24a, 24b, 24c and 24d to a control unit 25, which in turn is connected via a control line 26 to an inclination sensor 27. The inclination sensor 27 is arranged on top of the simulation cell 10 — parallel to its longitudinal and transverse axis. A suitable device is described in the German patent application no. P 38 26 591.5, "Inclination Sensor", which was filed at the same time.

The inclination sensor 27 controls the four water discharge points of the simulation cell 10. Only one of the four discharge points is open at a time. This means, according to the inclination position of the simulation cell, only one of the four solenoid valves is open at a time. For this purpose — at any arbitrary inclination — the inclination sensor 27 releases an electric signal, which, via the control unit 25, keeps the solenoid valve open, through which the water can be removed. In this way, the water is transported under pressure to the charging valve 18 and disposed of, as needed. Generally, as a charging valve, one uses a device, which has proven its worth in practice for fuel cell batteries with alkaline electrolytes.

The arrangement of the invention can also serve to recover water from $H_2/O_2$ fuel cell batteries with free moving electrolytes, for example, with an alkaline electrolyte, such as potassium hydroxide. In such fuel cell batteries, the reaction water dilutes the electrolyte and must therefore be removed from it. For this purpose, the free-moving electrolyte is placed in circulation by means of a so-called splitting vaporizer, whereby the reaction water is isolated according to a diffusion-condensation principle. The splitting vaporizer or electrolyte regenerator (i.e., the chambers from which the water is to be removed), are then designed in accordance with the invention.

What is claimed is:

1. An apparatus for recovering water from a fuel cell battery having perpendicularly arranged fuel cells, chambers from which water is to be removed and a discharge point at each of four lower corner points, each of the discharge points being arranged in one of two terminal chambers, comprising means interconnecting said chambers in two places in a lower area thereof, a plurality of media lines connecting the discharge points to at least one sluice, one valve being arranged in each media line, an inclination sensor arranged on the fuel cell battery in a direction parallel to the longitudinal and transverse axis of the battery, and a control unit which is connected to the inclination sensor by a control line, said control unit also being connected to the valves by control lines.

2. The apparatus of claim 1, wherein there is a single central sluice.

3. The apparatus of claim 1, wherein the chambers from which water is to be removed are connected in an upper area thereof by a media line to a supply of pressurized gas.

4. The apparatus of claim 1, wherein the valves are solenoid valves.

5. The apparatus according to claim 1, wherein the control unit functions to open one valve at a time depending on the inclination position of the fuel cell battery.

6. The apparatus according to claim 5, further comprising a priority circuit which opens a valve when the fuel cell battery is not in an inclined position.

7. The apparatus of claim 2, wherein the chambers from which water is to be removed are connected in an upper area by a media line to a supply of pressurized gas.

8. The apparatus of claim 2 wherein the valves are solenoid valves.

9. The apparatus of claim 2 wherein the control unit opens only one valve at a time depending on the inclination position of the fuel cell battery.

10. The apparatus of claim 9 further comprising a priority circuit which opens a valve when the fuel cell battery is not in an inclined position.

11. A fuel cell battery having an integral arrangement for removing water from chambers of the fuel cell battery, comprising a plurality of perpendicularly arranged fuel cells, a plurality of chambers from which water is to be removed, said chambers being interconnected in two places in a lower area thereof, a discharge point disposed in each of four lower corner points of the fuel cell battery, two of the discharge points being arranged at one battery extremity and being connected to one of two terminal chambers, a plurality of media lines connecting the four discharge points with at least one sluice, one valve being arranged in each media line, an inclination sensor arranged on the fuel cell battery in a direction parallel to the longitudinal and transverse axis of the battery, and a control unit connected to the inclination sensor by a control line, said control unit also being connected by control lines to the valves.

12. A fuel cell battery according to claim 11 which is a solid polymer electrolyte fuel cell battery wherein the chambers are oxygen chambers.

13. The fuel cell according to claim 11 which has a single central sluice.

14. The fuel cell according to claim 11 wherein the control unit opens only one valve depending on the inclination position of the fuel cell battery.

15. The fuel cell according to claim 14 further comprising a priority circuit for opening a valve when the fuel cell battery is not in an inclined position.

* * * * *